(12) United States Patent
Fathauer

(10) Patent No.: US 8,387,254 B2
(45) Date of Patent: Mar. 5, 2013

(54) METHOD OF REBUILDING SOLENOIDS FOR AUTOMATIC TRANSMISSIONS

(75) Inventor: Paul Fathauer, Sullivan, IN (US)

(73) Assignee: Advanced Powertrain Engineering, LLC, Sullivan, IN (US)

(*) Notice: Subject to any disclaimer, the term of this patent is extended or adjusted under 35 U.S.C. 154(b) by 234 days.

(21) Appl. No.: 12/905,409

(22) Filed: Oct. 15, 2010

(65) Prior Publication Data

US 2011/0088236 A1 Apr. 21, 2011

Related U.S. Application Data

(60) Provisional application No. 61/251,977, filed on Oct. 15, 2009.

(51) Int. Cl.
  *B23P 6/00* (2006.01)
  *B23P 19/04* (2006.01)
  *B23P 19/02* (2006.01)

(52) U.S. Cl. ............ 29/890.121; 29/402.06; 29/402.08; 29/426.4

(58) Field of Classification Search .............. 29/89.121, 29/402.06, 402.08, 426.4, 402.01–402.21, 29/890.124, 890.132, 426.1–426.6; 137/315.03, 137/15.18
See application file for complete search history.

(56) References Cited

U.S. PATENT DOCUMENTS

| | | | |
|---|---|---|---|
| 4,678,006 A | 7/1987 | Northman et al. | |
| 4,783,049 A | 11/1988 | Northman et al. | |
| 4,932,439 A | 6/1990 | McAuliffe, Jr. | |
| 4,947,893 A | 8/1990 | Miller et al. | |
| 5,090,109 A * | 2/1992 | Haas et al. | 29/596 |
| 5,121,769 A | 6/1992 | McCabe et al. | |
| 5,129,145 A * | 7/1992 | Matthews et al. | 29/890.121 |
| 5,135,027 A | 8/1992 | Miki et al. | |
| 5,184,644 A | 2/1993 | Wade | |
| 5,217,047 A | 6/1993 | McCabe | |
| 5,449,227 A | 9/1995 | Steinberg et al. | |
| 5,452,948 A | 9/1995 | Cooper et al. | |
| 5,651,391 A | 7/1997 | Connolly et al. | |
| 5,680,883 A | 10/1997 | Gluf | |
| 5,823,071 A | 10/1998 | Petrosky et al. | |
| 5,855,229 A | 1/1999 | Gluf, Jr. | |
| 5,887,851 A | 3/1999 | Trzmiel | |
| 5,904,180 A | 5/1999 | Iwamura et al. | |
| 6,019,120 A | 2/2000 | Najmolhoda et al. | |
| 6,038,918 A * | 3/2000 | Newton | 73/115.02 |

(Continued)

FOREIGN PATENT DOCUMENTS

| | | |
|---|---|---|
| EP | 0797008 | 5/2001 |
| EP | 1574770 | 12/2006 |

(Continued)

OTHER PUBLICATIONS

Doman, C. T. and R. I. Rice, Jr., "Parts Salvage—When Does it Pay to rebuild Parts?", Sep. 1961, SAE.*

(Continued)

*Primary Examiner* — David Bryant
*Assistant Examiner* — Matthew P Travers
(74) *Attorney, Agent, or Firm* — John V. Daniluck; Bingham Greenebaum Doll LLP

(57) ABSTRACT

A method of rebuilding a solenoid for use in automatic transmissions is disclosed. In one embodiment, an improvement over the original equipment design allows for increased durability of the solenoid. In another embodiment, a lower cost method is disclosed for reusing an expensive component. In either case, various components within the solenoid are reused, reconditioned or replaced. A preferred process for disassembling the solenoid is also disclosed.

18 Claims, 17 Drawing Sheets

U.S. PATENT DOCUMENTS

| | | | |
|---|---|---|---|
| 6,056,908 | A | 5/2000 | Petrosky et al. |
| 6,109,300 | A | 8/2000 | Najmolhoda |
| 6,155,137 | A | 12/2000 | Nassar et al. |
| 6,161,577 | A | 12/2000 | Nassar |
| 6,164,160 | A | 12/2000 | Nassar et al. |
| 6,164,732 | A | 12/2000 | Tominaga et al. |
| 6,269,827 | B1 | 8/2001 | Potter |
| 6,354,674 | B1 | 3/2002 | Iwamoto et al. |
| 6,450,424 | B1 | 9/2002 | Horbelt |
| 6,715,510 | B2 | 4/2004 | Herbert |
| 6,832,632 | B1 * | 12/2004 | Wallace .................. 137/625.66 |
| 6,894,217 | B2 | 5/2005 | Li |
| 7,051,993 | B2 | 5/2006 | Kim et al. |
| 7,104,273 | B1 * | 9/2006 | Stafford .................. 137/15.17 |
| 7,110,246 | B2 | 9/2006 | Tsunooka et al. |
| 7,220,085 | B2 * | 5/2007 | Nader et al. .................. 408/1 R |
| 7,233,503 | B2 | 6/2007 | Chen |
| 7,771,144 | B1 * | 8/2010 | Nader et al. .................. 408/1 R |
| 2008/0089044 | A1 | 4/2008 | Fathauer |
| 2009/0217523 | A1 * | 9/2009 | Johnson et al. .......... 29/888.011 |

FOREIGN PATENT DOCUMENTS

| | | | |
|---|---|---|---|
| WO | WO 2008/040944 | * | 4/2008 |
| WO | 2010033827 | | 3/2010 |

OTHER PUBLICATIONS

"AW Solenoid Tool Part #31333", Omega Machine & Tool, Inc.*
"Sonnax Transmission Products Catalog", 2010, Sonnax Industries, vol. 8, pp. 63, 146, 158.*
Stafford, Maura, "Restoring the Valve Bore: Reamer Technique", Sonnax Industries, pp. 165-166.*
"How to Repair Solenoids for Ford PMGR, Delco PMGR and Delco SD210/260 Starters," Technical Update 25, 87-254-1, Jan. 1995.

* cited by examiner

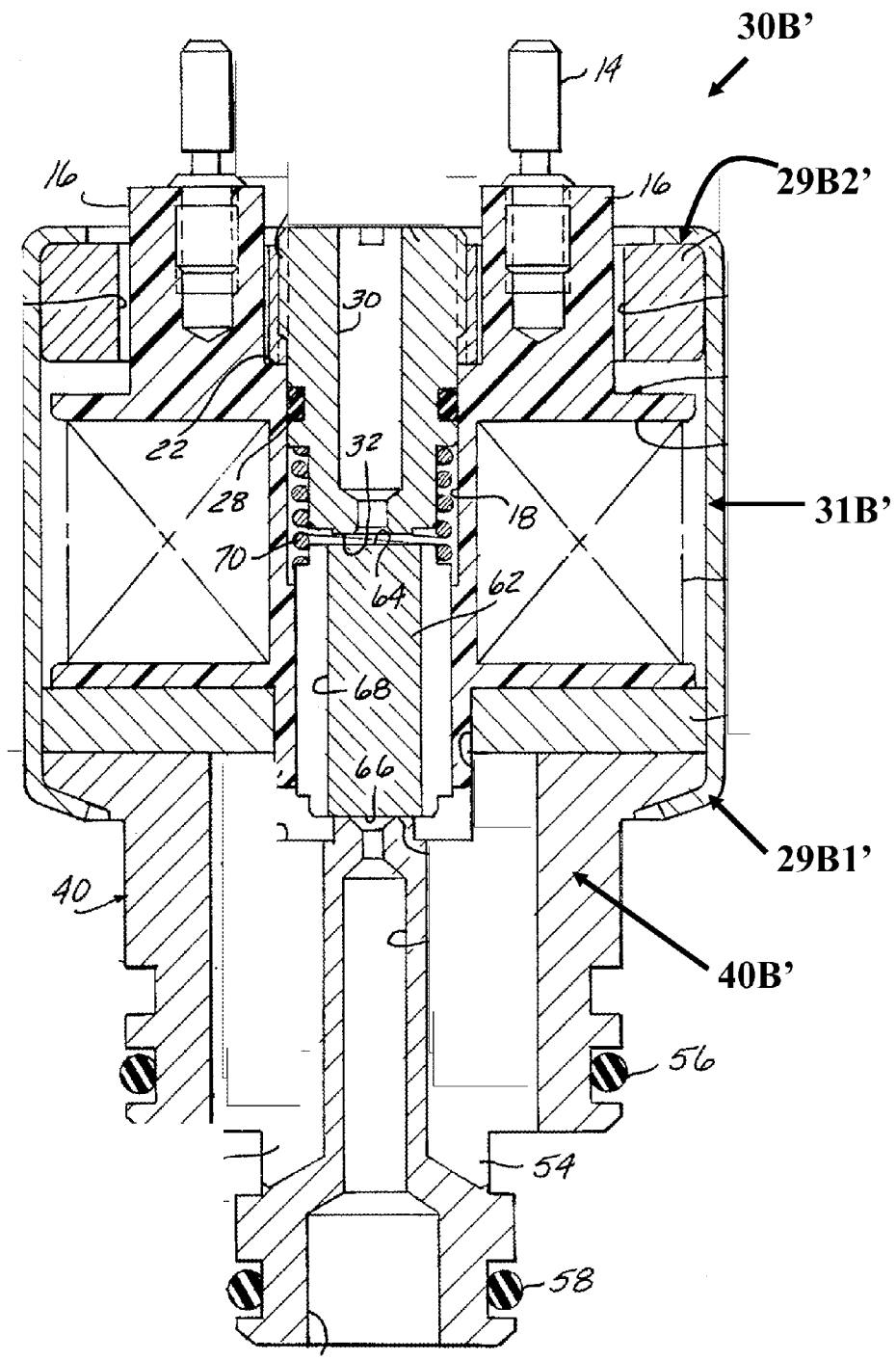
FIG. 8B *PRIOR ART*

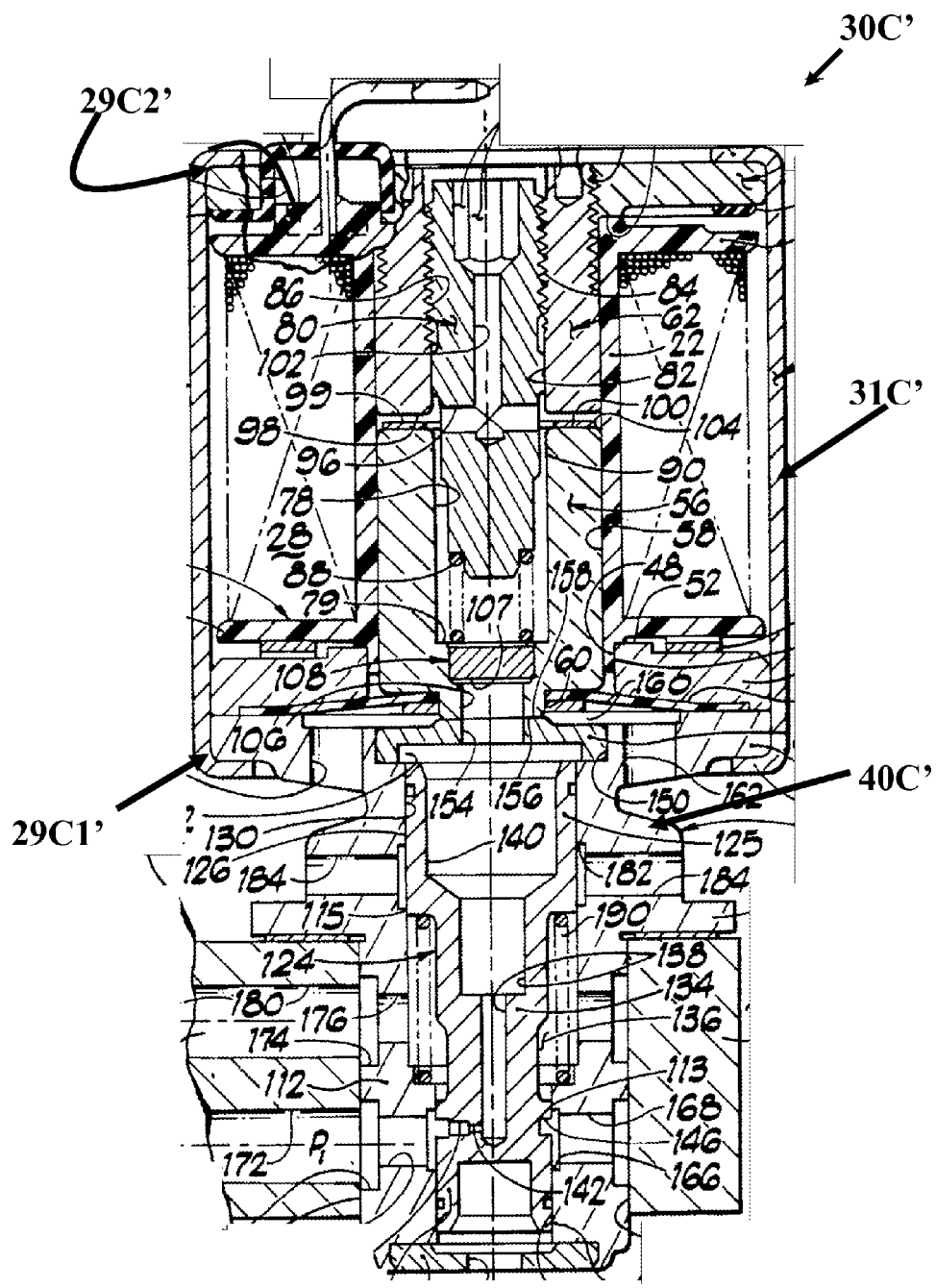
FIG. 8C  *PRIOR ART*

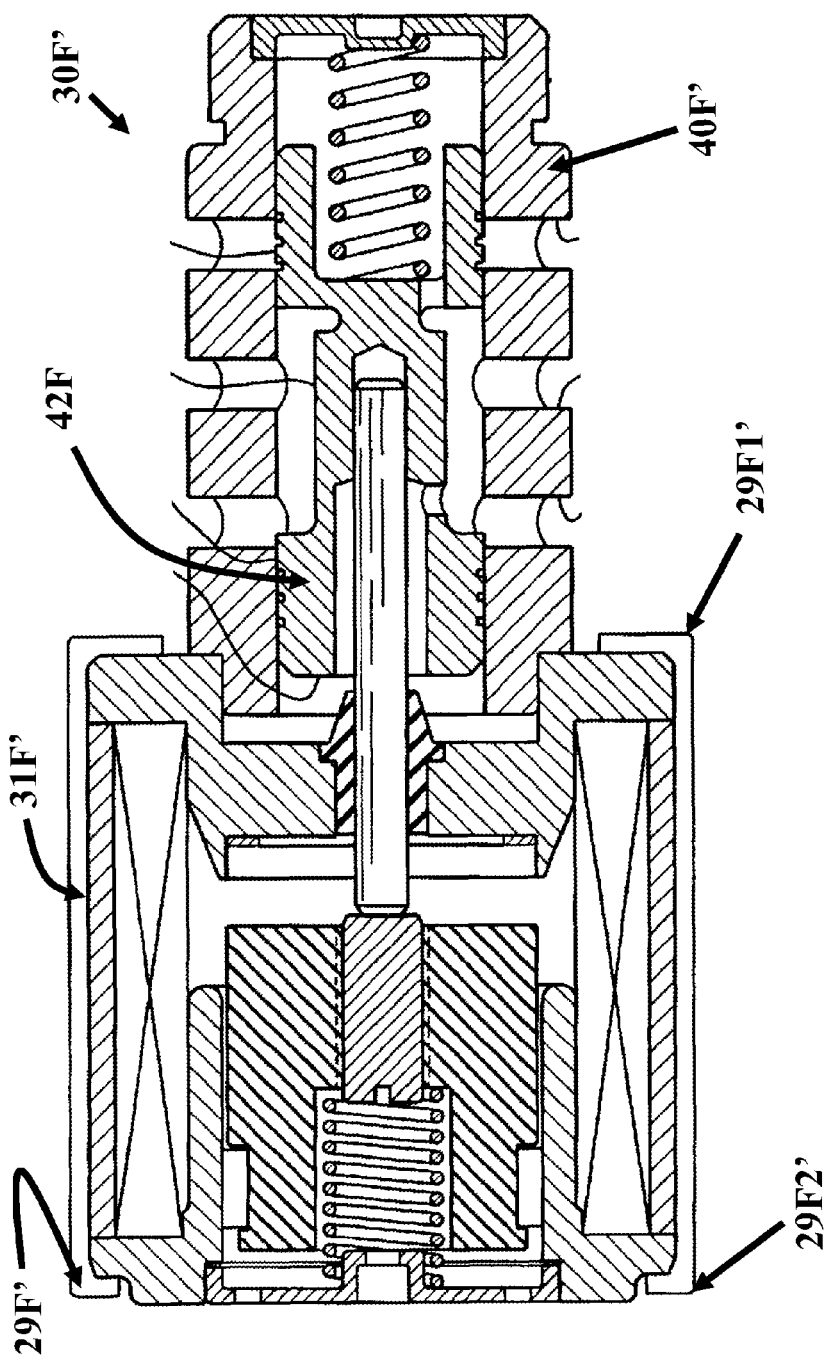
FIG. 8F *PRIOR ART*

METHOD OF REBUILDING SOLENOIDS FOR AUTOMATIC TRANSMISSIONS

CROSS REFERENCE TO RELATED APPLICATION

This application claims the benefit of priority to U.S. Provisional Patent Application Ser. No. 61/251,977, filed Oct. 15, 2009, entitled METHOD OF REBUILDING SOLENOIDS FOR AUTOMATIC TRANSMISSIONS incorporated herein by reference.

FIELD OF THE INVENTION

Various embodiments of the present invention pertain to methods and apparatus for rebuilding a solenoid, and in particular with regards to solenoids for automatic transmissions.

BACKGROUND OF INVENTION

Within the field of the automotive aftermarket, there are numerous parts that are considered to be "non-serviceable" items. In such cases, a new part is purchased at a substantial cost to the end user. In the field of automatic transmissions, one such common device is the solenoid module assembly that controls hydraulic flow and pressure within the transmission. A typical solenoid module includes a hydraulic manifold and one or more electromechanical solenoids. The hydraulic manifold contains numerous fluid circuit passages that hydraulically communicate with the solenoids. The electromechanical solenoids control either the flow (on/off control) through the passages or regulate pressure within the passages. Typically, the solenoids are electrically connected to a terminal housing that provides for a removable connection to a wire harness, allowing for communication to the powertrain control unit (PCU).

One such assembly is described in U.S. Pat. Nos. 4,687,006 and 4,783,049. In the described device, five electrically actuated solenoid assemblies are situated on an aluminum manifold block including multiple fluid passageways. The connections for the solenoids consist of round pins that extrude upwards through a PCB and are soldered into place. The PCB interconnects to a terminal connector providing communication through a wire harness to the PCU. This particular solenoid module has been used in the Ford E4OD and 4R100 automatic transmission since 1989. It has several failure modes and is a common replacement item. These new modules typically cost $150-200 to the end user. Several companies rebuild these modules by disassembling the unit, cleaning and reassembling the components. A new PCB of similar configuration to the original is soldered into place. A rebuilt unit costs approximately $100 to the end user.

Another such assembly is described in U.S. Pat. No. 6,056,908. The described technology is for a method of producing a solenoid module assembly with similar features to the '006 and '049 patents. However, in this invention, an overmolded circuit assembly is described in place of a PCB. In the preferred embodiment, circuit tracks are formed from strips of beryllium copper and overmolded with plastic. Furthermore, connection with the solenoids and terminal connection is preferably through the use of M shaped slots in which the solenoid terminals are pressed through. Therefore, the connection between the solenoid terminal and circuit track is made by the pressure generated from the displaced slot. This forms a one-way barbed type connection that prevents easy removal of the circuit track. This is preferable because it prevents the slot from "backing off" the solenoid terminal. However, this connection style inhibits the removal of the circuit assembly for servicing. One feature of this style of connection is that instead of round terminal pins, rectangular pins are generally used.

A variation of the '908 technology is the solenoid module produced by Bosch that is used in the Ford 5R55S, 5R55W and 5R55N automatic transmissions. This module is shown in FIGS. 1 and 2. This solenoid module has high failure rates, similar to the E4OD/4R100 solenoid module described in the '006 and '049 patents. This solenoid module costs the end user between $250-400. There has been extensive interest in rebuilding this module as the failure is generally localized to at least one of the three variable force solenoids (VFS) and/or a broken circuit trace within the module. However, the circuit assembly cannot be easily removed in one piece for reuse. The circuit assembly consists of multiple circuit tracks that are placed within two plastic housings that are snapped together, sandwiching the circuit tracks into place. During the removal process, the circuit assembly flexes, which releases the snapped connections between the 2 housings, and results in the circuit tracks to fall out of location. The defective solenoids can be replaced with new, good used or rebuilt ones. Unfortunately, new ones are not available to the general public. It has also been found that a substantial failure rate exists in used ones. Therefore, even if a good used one is installed, the long-term reliability of the solenoid is not known.

Some embodiments described herein address various aspects of this technology in novel and nonobvious ways.

SUMMARY OF THE INVENTION

Various aspects of some of the embodiments described herein pertain to methods for restoring a solenoid and valve assembly.

Yet other aspects of some embodiments pertain to methods for restoring the proper hydraulic function of a solenoid and valve assembly by reworking some existing components and substituting other components that are different in size than the component they replace.

Yet other aspects of some embodiments pertain to a method for disassembling a solenoid assembly that is coupled together by a crimped or swaged mechanical connection. In some embodiments, the swaged connection is cut into segments. In yet other embodiments, the swaged portion of the connection is machined (such as on a lathe) to a thinner cross section. In some embodiments, the swaged connection is at the end of the assembly that includes an electrical connector. In yet other embodiments, the swaged connection is on the end of the housing opposite of the electrical connector.

Yet other embodiments of the present invention pertain to restoring the proper functioning of a solenoid and valve assembly by replacing the used aluminum valve housing with a valve housing fabricated from a powered metal.

One aspect of the present invention pertains to a method for restoring a used solenoid and valve assembly. Some embodiments include providing a used solenoid assembly including a housing connected by a crimped mechanical connection to a valve housing. Other embodiments include removing at least two, separated segments of the crimped connection, and pulling apart the used valve housing from the used housing.

Another aspect of the present invention pertains to a method for restoring a used solenoid and valve assembly. Some embodiments include providing a used solenoid assembly including a housing connected to a valve housing, the housing holding within it an electromagnetically actuator, the valve housing holding within it a holding within it an actuatable valve element movable by the actuator along an axis.

Other embodiments include disassembling the used valve housing and used spool valve from the used solenoid assembly, and replacing the used spool valve with a different spool valve. Still other embodiments include increasing the inner diameters of the metering lands of the used valve housing to receive therethrough the corresponding metering diameters of the different valve, reassembling the different spool valve and the used valve housing, and testing the flow characteristics of the reassembled solenoid assembly.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

FIG. 8B is a cross sectional depiction of a solenoid valve assembly modifiable by various embodiments of the present invention.

FIG. 8C is a cross sectional depiction of another solenoid valve assembly modifiable by various embodiments of the present invention.

FIG. 8F is a cross sectional depiction of another solenoid valve assembly modifiable by various embodiments of the present invention.

DESCRIPTION OF THE PREFERRED EMBODIMENT

Figure 1:
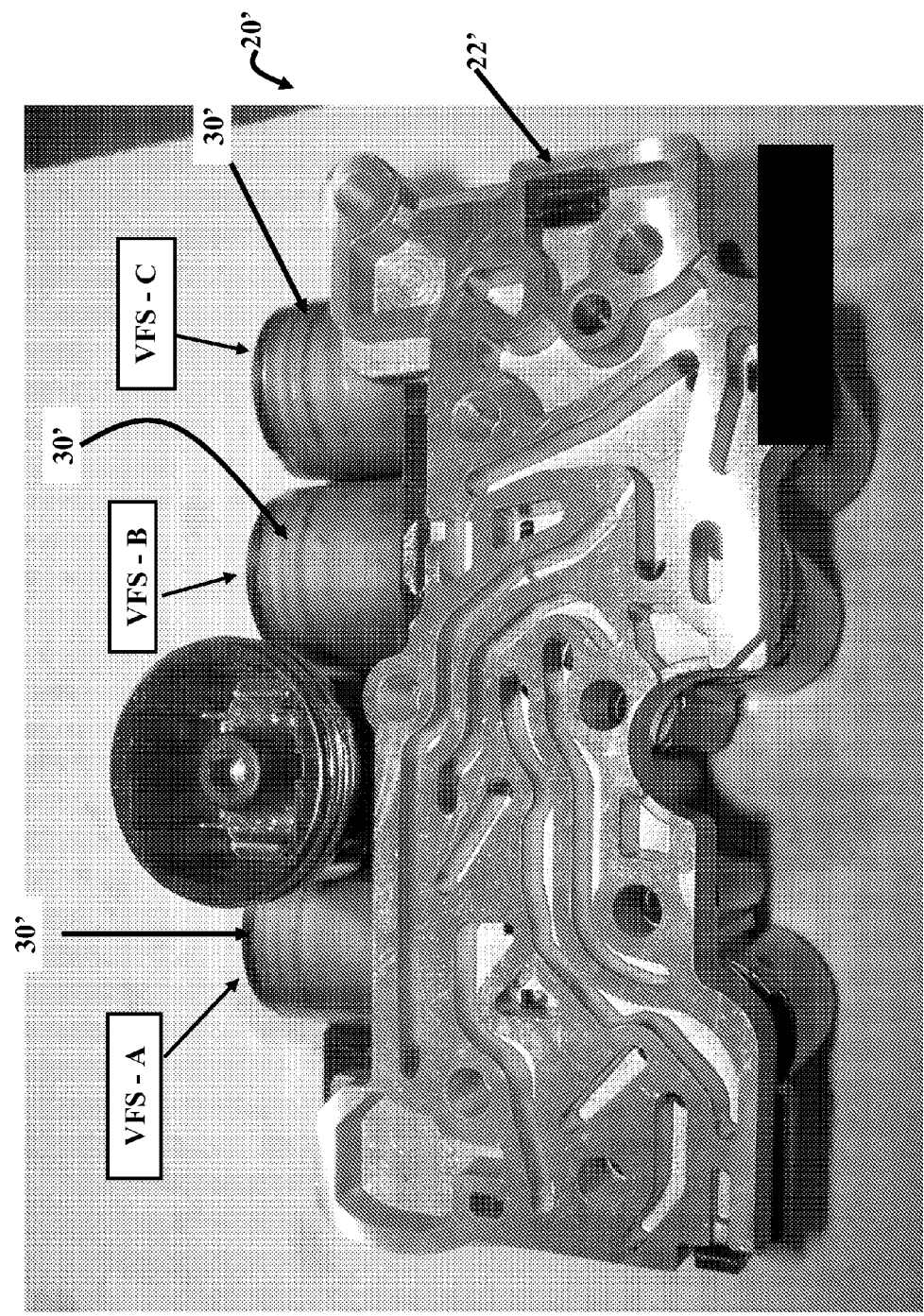
FIG. 1 shows a photographic representation of a known 5R55 solenoid module.
Figure 2:
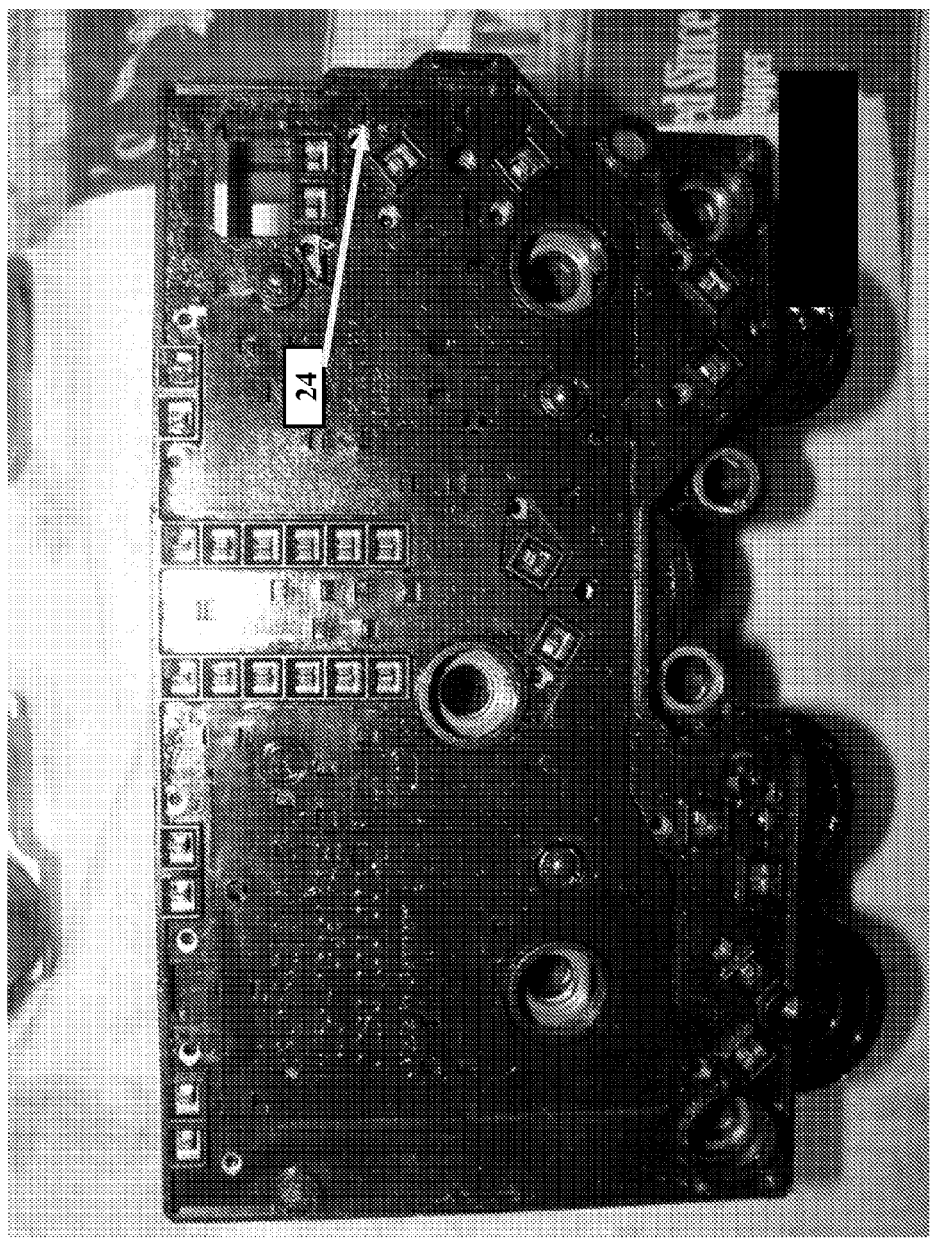
FIG. 2 shows a photographic representation of a known solenoid module from the circuit assembly side.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition. The use of a prime (') designation after an element number refers to that same element number as it was previously known (i.e., before that same element is modified to include an embodiment of the present invention). For example, 30' refers to a solenoid and valve assembly prior to modification of the solenoid and valve assembly according to an embodiment of the present invention.

Various embodiments of the present invention include methods and apparatus for restoring the proper functioning of a used solenoid and valve assembly. Such assemblies are typically not reworked, and are simply discarded. However, it has been discovered that such used assemblies, heretofore considered scrap, can be economically returned to full working status. In so doing, the restored assembly saves resources (since it is not necessary to use additional raw materials to build a new device), saves energy (since the energy expended restoring the used solenoid is likely only a fraction of the energy required to make a new one), and of course saves money.

Used solenoid and valve assemblies are often acquired from transmissions that have been removed from service, and which are subsequently disassembled. The various disassembled parts can then be individually examined to see if they can be used again in a rebuilt transmission. In some cases it is preferable to restore the used part to the original equipment manufacturer (OEM) performance specification prior to the incorporation of the restored parts into a rebuilt transmission. Some components (such as used seals) may be so worn, and the cost of a new component so low, that the components are simply discarded. Yet other components, such as the solenoid valve assemblies discussed herein, are relatively more expensive to replace, and therefore are candidates for restoration to OEM-type operation.

In one embodiment, there is a method for removing a valve housing from a solenoid. In some situations, a new valve housing and a new solenoid are connected to each other in a permanent manner by a method that includes elastically deforming part of one component over another part of a different component. Since the method of making the new connection involves inelastic deformation, it is difficult to remove the valve assembly from the solenoid assembly without so much damage to either component that one or both components must be discarded. In one embodiment, the inelastically deformed section is mechanically removed (such as by machining) in spaced apart segments. Since the portions of the connections that remain are smaller, and further have lost the structural integrity provided by being a continuous hoop, the solenoid assembly can be forced apart from the valve assembly without damaging either component. The remainder of the deformed section still holding the solenoid and valve together is significantly weaker because of the segments that have been removed, and during the operation where the components are forced apart the remainder of the deformed connection simply bends inelastically out of the way (thus permitting disassembly).

Yet other embodiments of the present invention pertain to methods for replacing a spool valve actuatable by a solenoid. In some applications, the exiting spool valve is fabricated from a hardened steel, and a valve operates within the bore of a valve housing Since the aluminum is softer, continued operation of the valve over a long period of time tends to wear down the aluminum. One embodiment of the present invention pertains to reworking the bores of the aluminum valve housing to predetermined larger diameters. A different spool valve replaces the original spool valve. The different spool valve has substantially the same axial dimensional relationships as the original valve, but the metering diameters of the different spool valve are adapted and configured to operate within the reworked aluminum valve housing (i.e., the metering diameters of the different spool valve are larger than the corresponding diameters of the original spool valve).

Yet other embodiments pertain to a method for restoring a used solenoid valve assembly to a proper functioning state. The method includes replacing the original valve housing with a housing fabricated from a powered metal. In yet other embodiments, the original steel spool valve is replaced with an aluminum spool valve having hardened metering diameters. It is believed that the powered metal housing and the replacement aluminum spool valve have significantly longer life.

Some embodiments of the present invention relate to a fluid control device such as a solenoid module assembly 20 including several actuators or solenoid valve assemblies 30, arranged and secured within a manifold block, hence constituting a solenoid block assembly or module, which is primarily adapted for automatic transmissions used in motor vehicles. A solenoid valve assembly 30 includes an electromagnetic actuator that operates directly on a spool valve received within a valve housing provided with hydraulic fluid. These actuators 30 are provided with electrical actuation via plastic circuit assembly 24. In such an assembly, if at least one component fails, the whole module is affected and deemed defective. However, some embodiments of the present invention also relate to individual solenoids that are not arranged and secured within a solenoid block assembly or module. For example, actuators and solenoids that are individually inserted and secured in a valve body primarily adapted for automatic transmissions in general.

Some embodiments of the present invention include replacing failed components within these solenoids; however, some embodiments of the present invention also relate to individual solenoids in general. One embodiment of the invention allows for improved durability and subsequent reliability of the solenoid. Another embodiment provides for a low cost method of restoring the solenoid function. In both cases, a method for disassembling the solenoid is demonstrated.

For illustrative purposes of one application of one embodiment of the present invention, a variable force solenoid 30 (VFS) that is used in the solenoid module assembly for the Ford 5R55 transmission is used. In particular, this assembly is utilized in the 5R55N, 5R55W and 5R55S versions. However, it is understood that various embodiments of the present invention pertain to any type of solenoid that includes a continuous circular crimped connection between the external housing of the solenoid assembly and a part of the internal assembly of that solenoid assembly.

Figure 3:
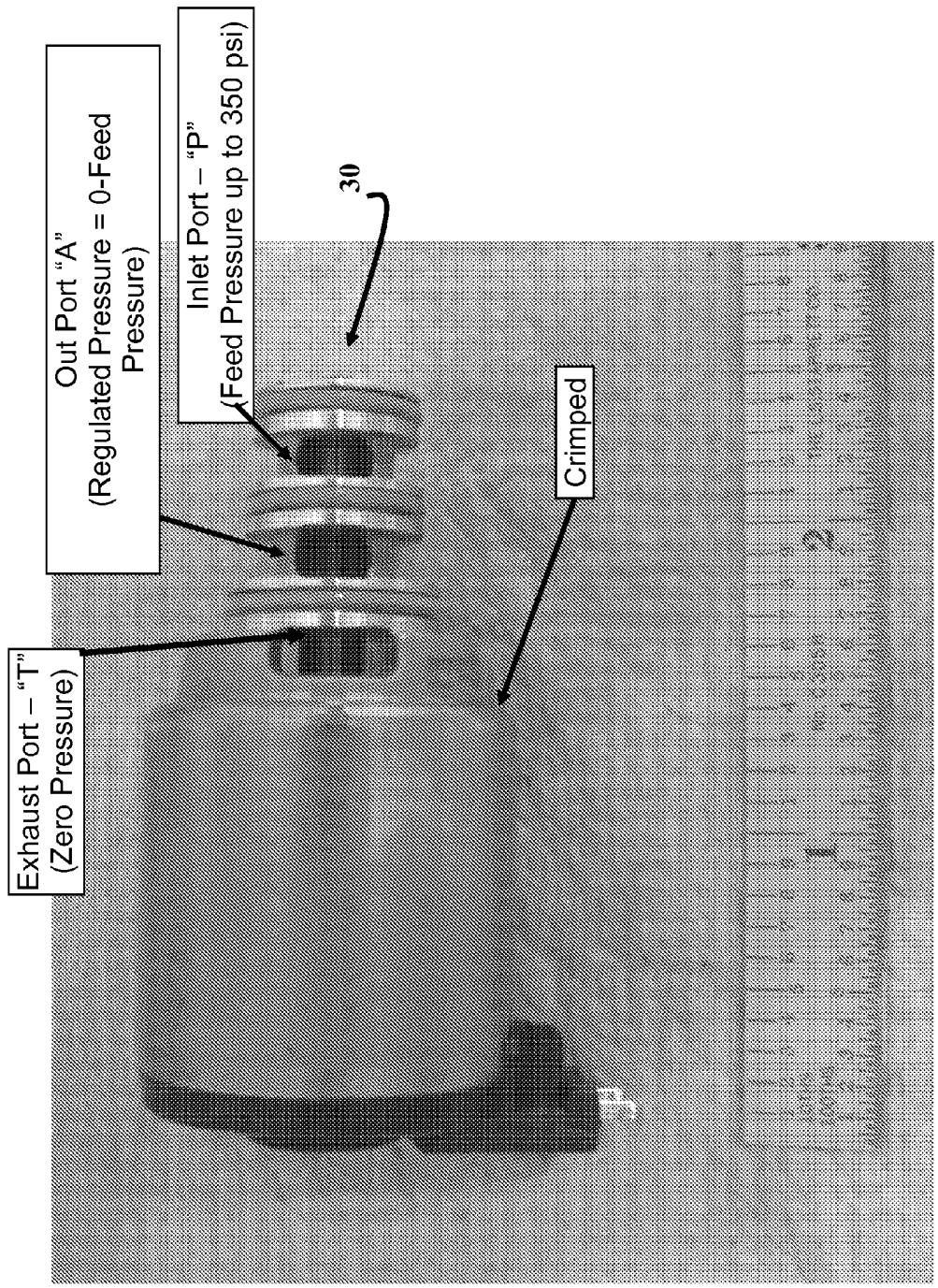
FIG. 3 shows a photographic representation of a known variable force solenoid (VFS) compatible with the apparatus of FIGS. 1 and 2, and shown in a used state.

The hydraulic pressures of various hydraulic circuits within the transmission are controlled by three of these VFS solenoids. The VFS solenoids are shown as VFS A, B and C in FIG. 1. A VFS solenoid after being removed from the assembly is shown in FIG. 3. The inlet port of the solenoid is shown in FIG. 3 as port P, which is exposed to the feed pressure of the transmission. The feed pressure can be as high as 350 psi. The outlet port is shown as port A. The outlet pressure is regulated between zero and the feed pressure by the VFS solenoid (as commanded by the PCU). The exhaust port is shown in FIG. 3 as port T. The exhaust port is openly vented and therefore having zero pressure under normal operation.

Figure 4:
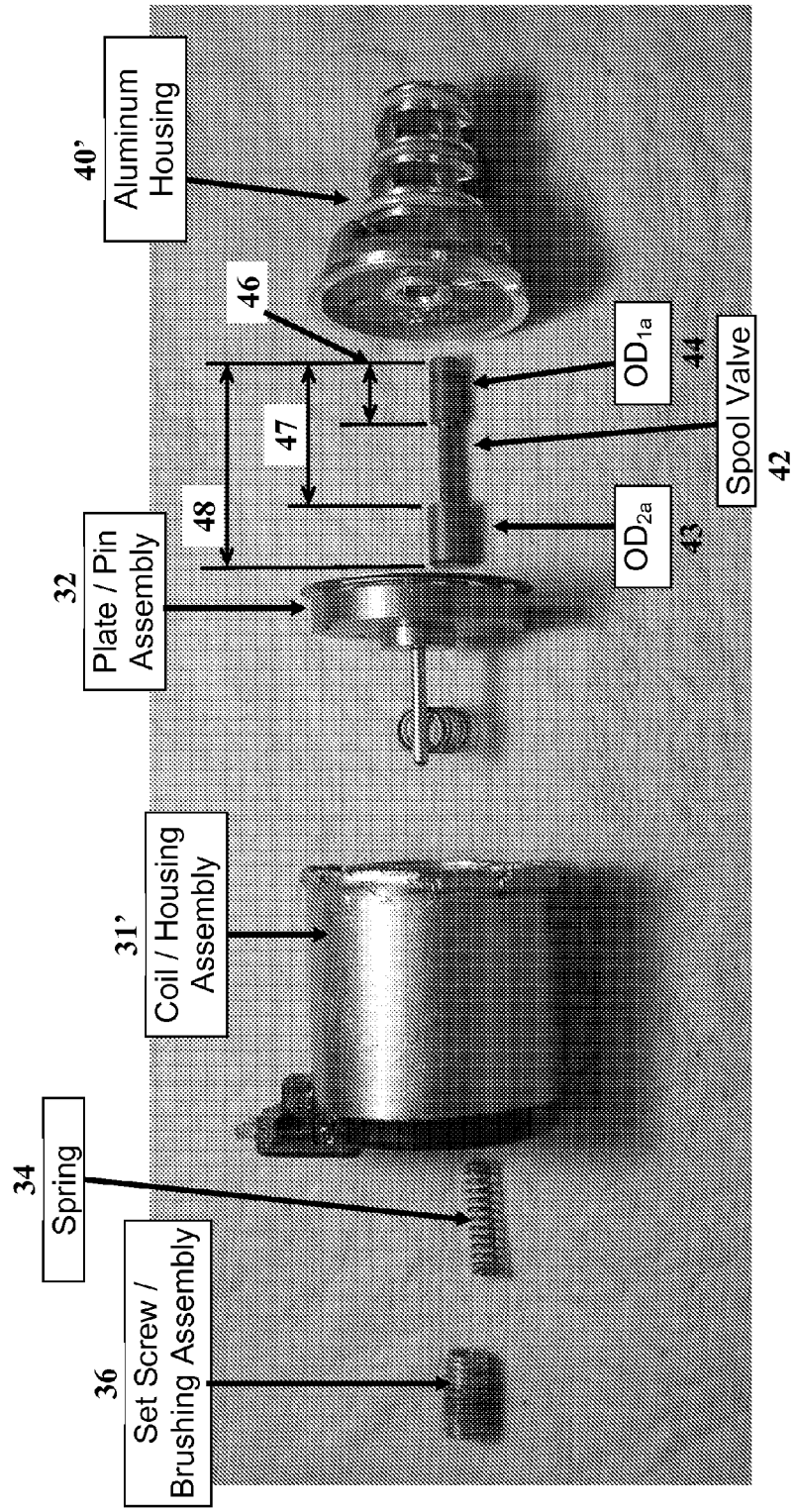
FIG. 4 shows a photographic representation of the variable force solenoid of FIG. 3 after disassembly.

A disassembled VFS solenoid is depicted in FIG. 4. This solenoid 30 includes an adjustment set screw/bushing assembly 36, spring 34, electromagnetic coil/housing assembly 31', plate/pin assembly 32, spool valve 42 and valve housing 40'. The plate/pin assembly is freely positioned within the coil/housing assembly and statically lies at the top of the coil. The plate/pin assembly is resisted by pressure from the spring and the plate.

The spool valve includes two lobes with metering diameters of $OD_{1a}$ (44) and $OD_{2a}$ (43), where $OD_{1a} < OD_{2a}$. The spool valve 42 is resisted by the plate/pin assembly in the axial direction towards the coil. The spool valve 42 is free floating in the opposing direction; however, it is prevented from slipping out of the housing by the larger lobe ($OD_{2a}$) on the spool valve 42.

In operation, the spool valve 42 is hydraulically urged towards the plate/pin assembly 32 because of the area difference between $OD_{1a}$ and $OD_{2a}$. Therefore, the spool valve will tend to move in conjunction with the plate/pin assembly. The pressure is controlled through the housing by varying the position of the spool valve relative to the inlet and outlet port in the housing. The position of the spool valve is changed by varying the current flow through the coil. As the current is incrementally increased, the plate/pin assembly incrementally moves against the spring pressures into the coil and hence the spool valve is urged towards the coil. As the spool valve moves, the pressure drops between the inlet and outlet of the housing changes.

Figure 5:
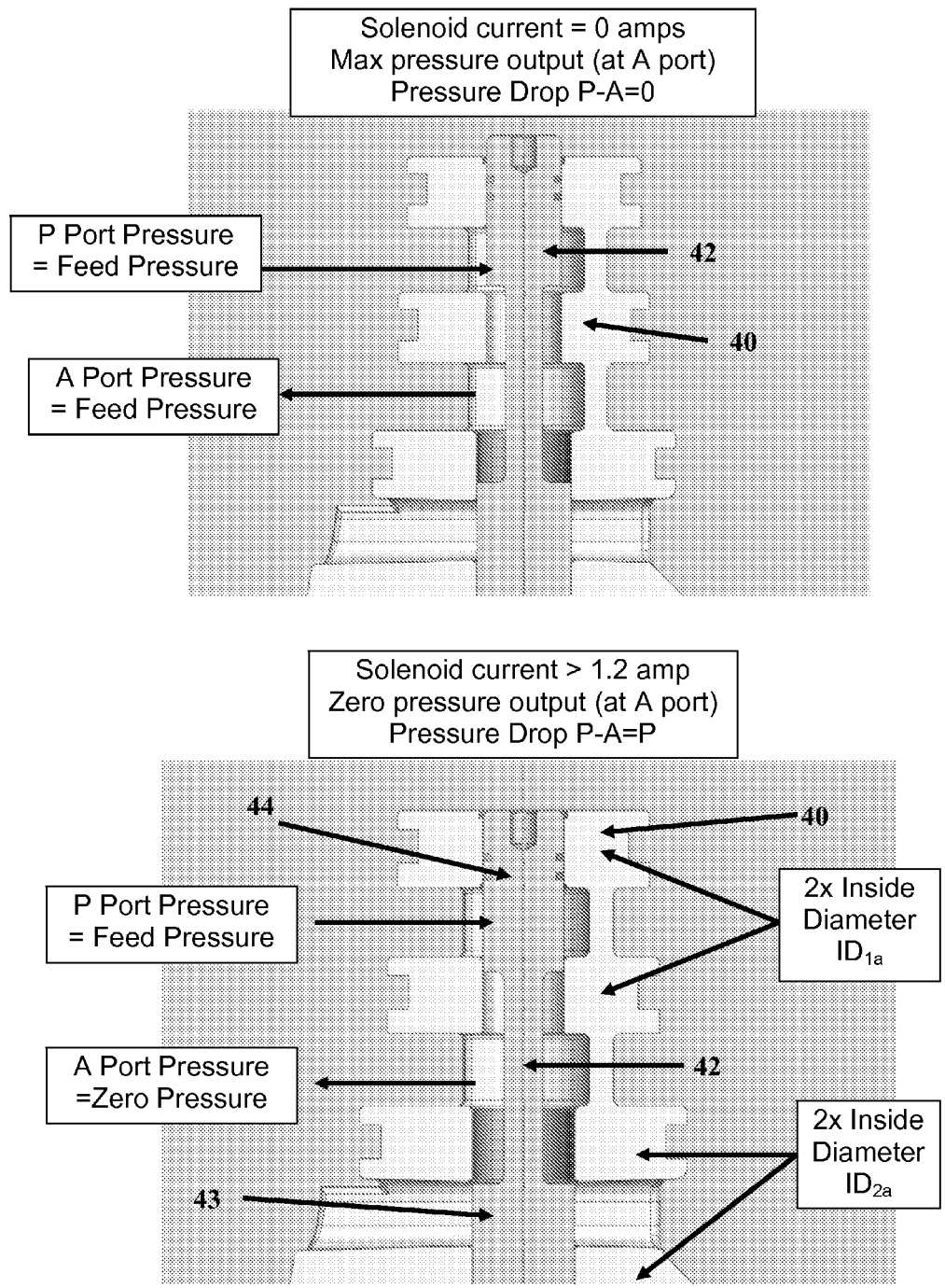
FIG. 5 shows schematic representations of the minimum/maximum positions of the spool valve shown in FIG. 4 during operation, with the top figure pertaining to operation at 0 amps and the bottom diagram referring to operation at more than 1.2 amps.

The positions of the spool valve in the maximum positions are depicted in FIG. 5. One element of the spool valve movement is the interface between the spool valve and valve housing. This interface is defined by the outside diameters of the spool valve (noted earlier) and the inside diameters of the valve housing. The inside bore diameters of the valve housing $ID_{1a}$ and $ID_{2a}$, where $ID_{1a} < ID_{2a}$ are shown in FIG. 5 as well.

Figure 6:
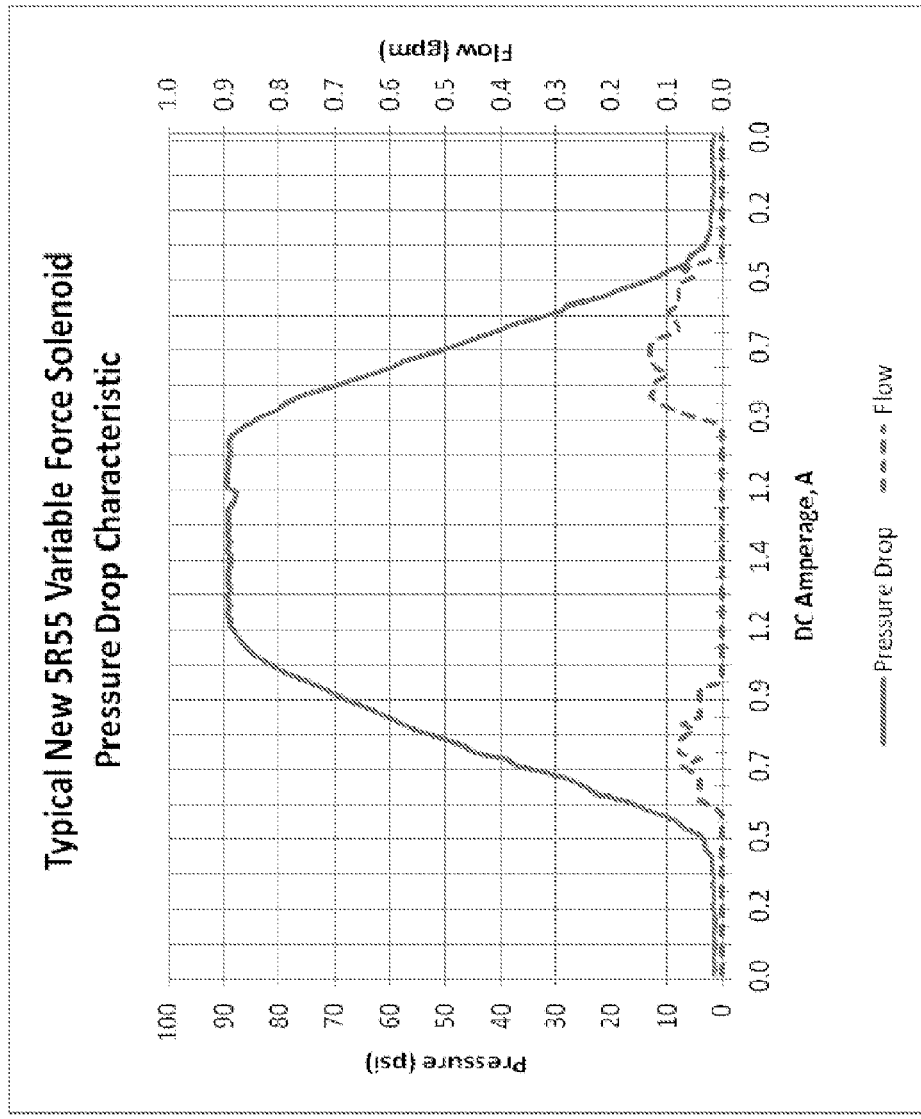
FIG. 6 shows a graphical depiction of the pressure drop characteristic for a new VFS solenoid for 90 psi feed pressure.

An example of the pressure drop response for a new VFS solenoid is shown in FIG. 6. FIG. 6 depicts electrohydraulic operation of a solenoid valve assembly within a range of OEM performance. For example, the pressure drop curve of FIG. 6 lies within upper and lower bands of pressure, flow rate and amperage that define OEM-type functioning.

As shown in FIGS. 5 and 6, when the solenoid is de-energized (zero amp flow), the pressure between the inlet (Port P) and outlet (Port A) is the same, hence the pressure drop is near zero. As current is increased and the spool valve shifts to the fully energized position, the pressure drop increases linearly from about 0.4 amps to 1.2 amps. At a current flow of 1.2 and above, the hydraulic communication between the inlet (Port P) and outlet (Port A) is closed and hydraulic communication between outlet (Port A) and exhaust (Port T) is opened. Therefore, the pressure at the outlet (Port A) is zero and hence the maximum pressure drop is achieved. A similar, mirrored pressure response occurs as the current is subsequently decreased; however, the linear decrease occurs between 1.0 amps and 0.3 amps. The flow is also charted in FIG. 6 on the secondary y-axis. This represents the flow of fluid (or leakage) between the P-port and the top of the spool valve and the A-port and the T-port (exhaust). As shown in FIG. 6, the flow is generally lower than 0.15 gpm (0.57 lpm) for a new solenoid.

Figure 7:
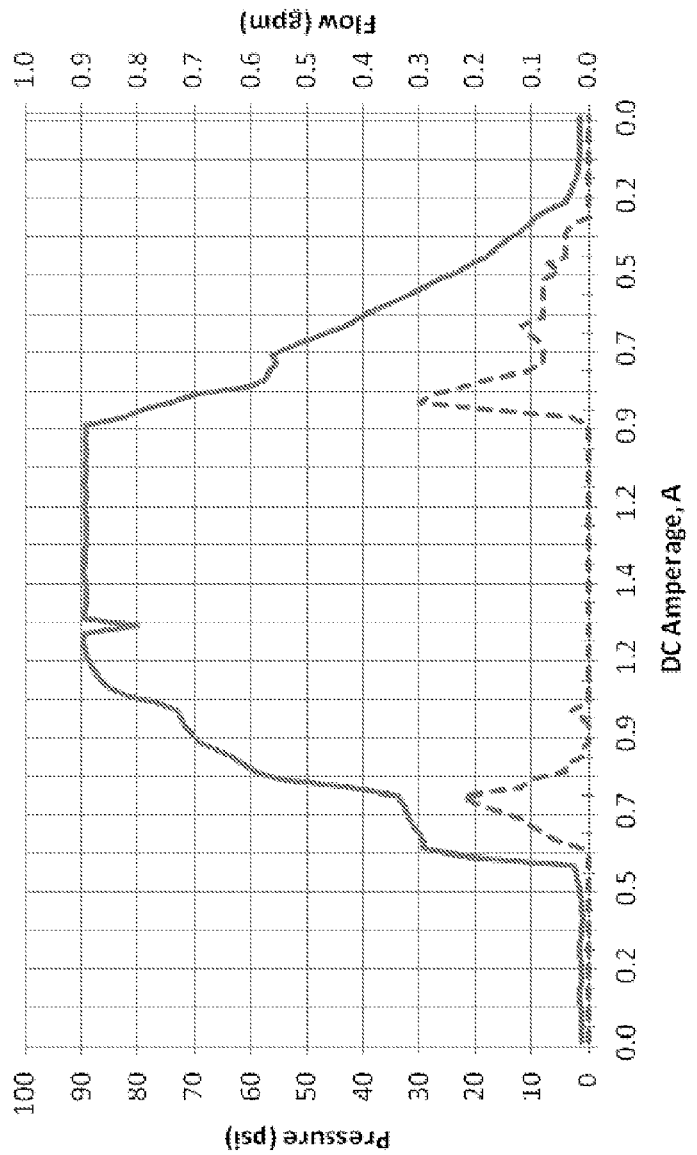
FIG. 7 shows a graphical depiction of the pressure drop characteristic for a used VFS solenoid for 90 psi feed pressure.

An example of the pressure drop of a used VFS solenoid is shown in FIG. 7. In comparing the electrohydraulic characteristics of FIGS. 6 and 7, it can be seen that FIG. 7 shows several points of operation that fall outside of the OEM range. As one example, it can be seen that the flow rates at 0.75 amps and 0.96 amps are significantly higher than the corresponding values of FIG. 6, and also falling outside of the OEM functional range. It has been found by studying defective solenoids that the pressure curves are often erratic and non-linear. In addition, the leakage of fluid is higher, thus indicating increased clearances from wear between the spool valve and housing. It has been found that the degradation in performance is due to several factors, including contamination within the solenoid, excessive wear of the inside bores of the housing, broken spool valves or worn set screw/bushing assemblies. In addition, the spool valve may be prevented from moving smoothly within the housing because of a defect of the housing or spool valve or a foreign body within the spool valve/housing interface.

A methodology has been developed according to one embodiment of the present invention for restoring the function of the solenoid by (1) disassembling (or opening) the solenoid 30, (2) returning the hydraulic function of the solenoid 30 by restoring the clearances between the spool valve 42 and housing 40, (3) repairing or replacing various components within the solenoid and (4) reassembling the solenoid 30. It is understood, that one or more of the aspects in the disclosed methodology may not be required for repairing the solenoid. For example, the clearances of the spool valve and housing may be within specification and therefore this particular aspect may not be performed in the rebuilding of the solenoid. As another example, various components of the solenoid, such as the spring and adjustment set screw/bushing assembly, can be repaired or replaced without "opening" the solenoid.

Figure 8A:
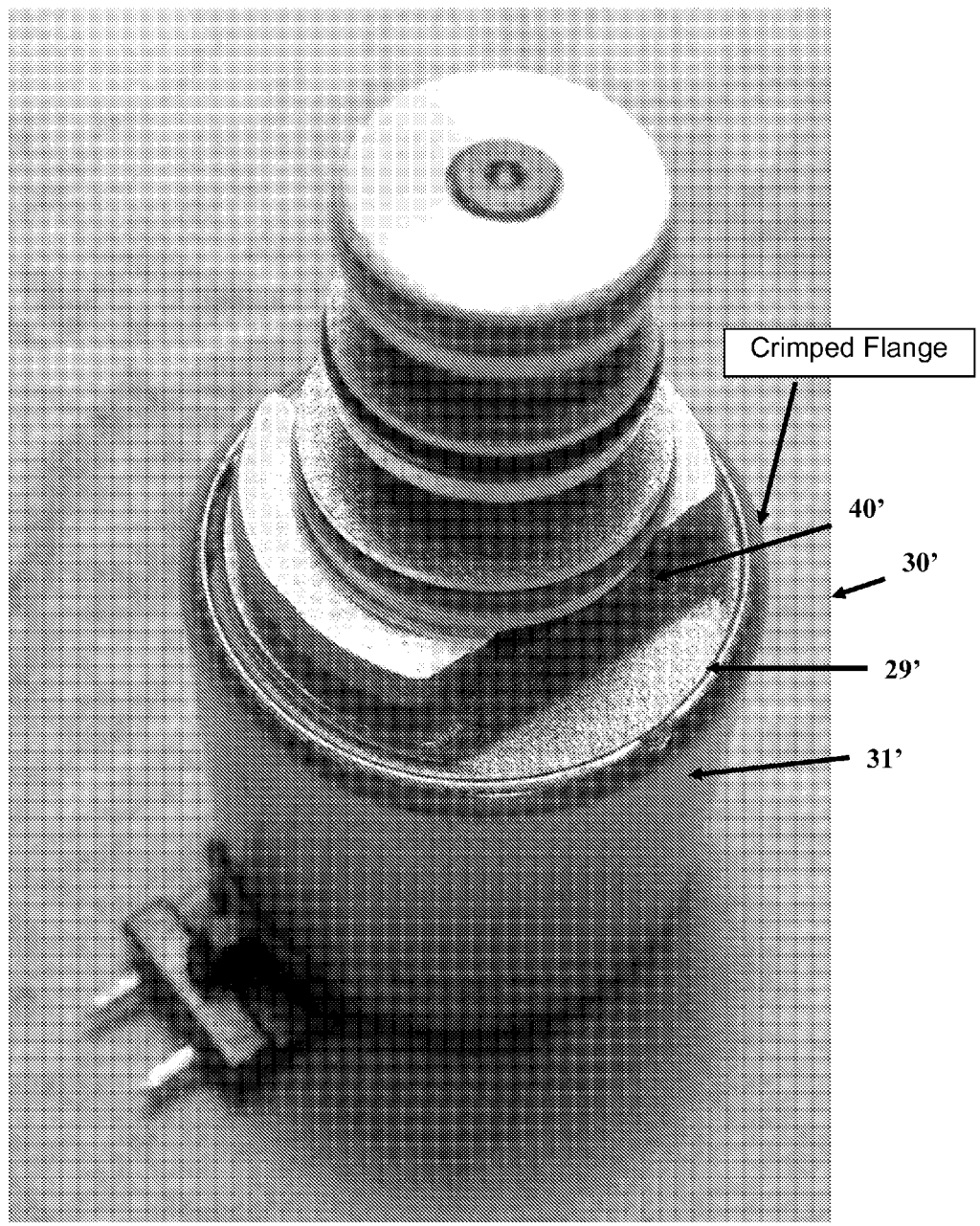
FIG. 8A shows a photographic representation of the solenoid of FIG. 3 prior to notching according to one embodiment of the present invention.

The solenoid can be assembled together by crimping the circular flange (shown in FIG. 8A) of the coil/housing around the valve housing. It is understood that crimping operations as typically known to those of ordinary skill in the art include operations in which the material of one component is inelastically moved to a position where it interferes with the removal of a second component. As shown in FIG. 8A, electromagnetic coil/housing assembly 31' includes a circumferential ridge 29' that is bent over the edge of a circular flange of house 40. Preferably, the second component and the first component are held together in tight contact during the crimping operation, such that there is little or no relative looseness after the crimping operation.

FIGS. 8B, 8C, 8D, 8E, and 8F give examples of various solenoid valve assemblies modifiable by various embodiments of the present invention described herein.

FIG. 8B shows a solenoid valve assembly 30B'. A valve housing 40B' is connected to a solenoid housing 31B' by a first crimped connection 29B1'. A second crimped connection 29B2' supports other components of the solenoid actuator within housing 31B'. It is understood that the second crimped connection 29B2' is modifiable according to various embodiments of the present invention. The base drawing of FIG. 8B is taken from U.S. Pat. No. 4,932,439 to McAuliffe. It is understood that FIG. 8B as originally filed includes some element numbers and lines from that patent. However the element numbers referred to above are shown in a distinctive and larger font.

FIG. 8C shows a solenoid valve assembly 30C'. A valve housing 40C' is connected to a solenoid housing 31C' by a first crimped connection 29C1'. A second crimped connection 29C2' supports other components of the solenoid actuator within housing 31C'. It is understood that the second crimped connection 29C2' is modifiable according to various embodiments of the present invention. The base drawing of FIG. 8C is taken from U.S. Pat. No. 5,121,769 to McCabe et al. It is understood that FIG. 8C as originally filed includes some element numbers and lines from that patent. However the element numbers referred to above are shown in a distinctive and larger font.

Figure 8D:
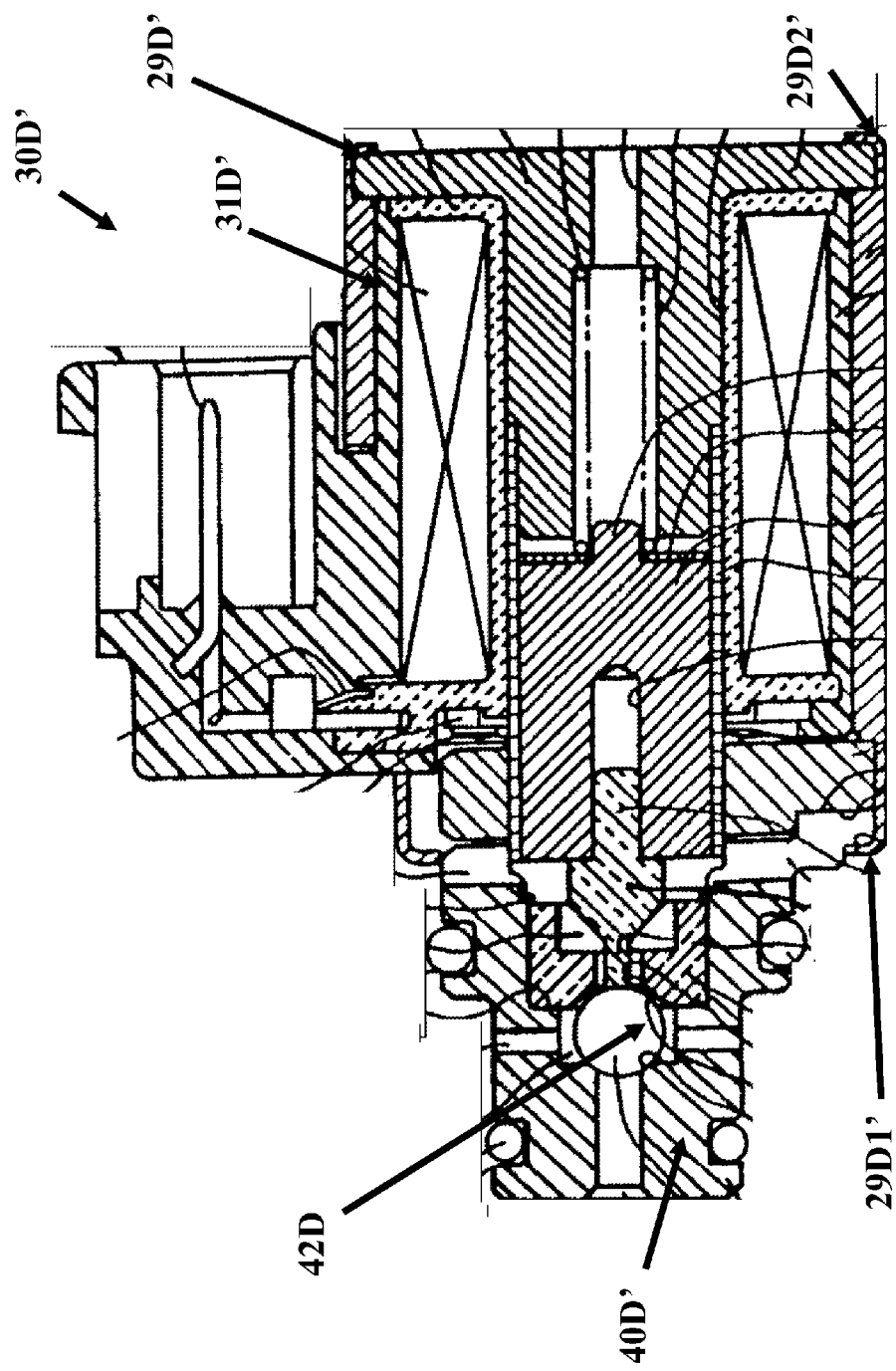
FIG. 8D is a cross sectional depiction of another solenoid valve assembly modifiable by various embodiments of the present invention.

FIG. 8D shows a solenoid valve assembly 30D'. A valve housing 40D' is connected to a solenoid housing 31D' by a first crimped connection 29D1'. A second crimped connection 29D2' supports other components of the solenoid actuator within housing 31D'. Valve housing 40D' includes within it a ball 42D that is actuatable by the electromagnetic actuator within housing 31D'. It is understood that the second crimped connection 29D2' is modifiable according to various embodiments of the present invention. The base drawing of FIG. 8D is taken from U.S. Pat. No. 5,135,027 to Miki et al. It is understood that FIG. 8D as originally filed includes some element numbers and lines from that patent. However the element numbers referred to above are shown in a distinctive and larger font.

Figure 8E:
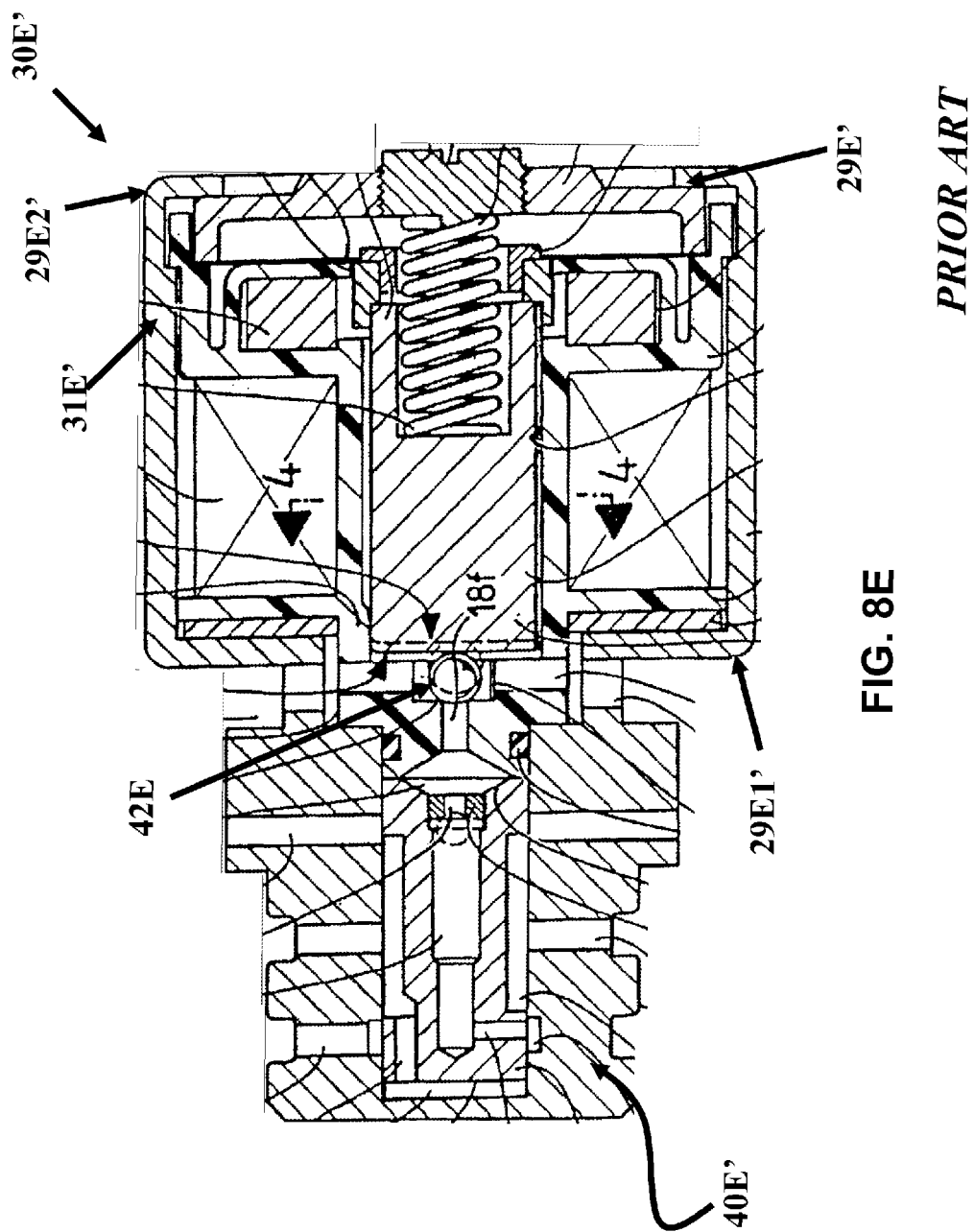
FIG. 8E is a cross sectional depiction of another solenoid valve assembly modifiable by various embodiments of the present invention.

FIG. 8E shows a solenoid valve assembly 30E'. A valve housing 40E' is connected to a solenoid housing 31E' by a first crimped connection 29E1'. A second crimped connection 29E2' supports other components of the solenoid actuator within housing 31E'. It is understood that the second crimped connection 29E2' is modifiable according to various embodiments of the present invention. Valve housing 40E' includes within it a ball 42E that is actuatable by the electromagnetic actuator within housing 31E'. The base drawing of FIG. 8E is taken from U.S. Pat. No. 6,109,300 to Najmolhoda. It is understood that FIG. 8E as originally filed includes some element numbers and lines from that patent. However the element numbers referred to above are shown in a distinctive and larger font.

FIG. 8F shows a solenoid valve assembly 30F'. A valve housing 40F' is connected to a solenoid housing 31F' by a first crimped connection 29F1'. A second crimped connection 29F2' supports other components of the solenoid actuator within housing 31F'. Valve housing 40F' includes within it an actuatable valve element 42F, such as a spool valve. It is understood that the second crimped connection 29F2' is modifiable according to various embodiments of the present invention. The base drawing of FIG. 8F is taken from U.S. Pat. No. 6,269,827 to Potter. It is understood that FIG. 8F as originally filed includes some element numbers and lines from that patent. However the element numbers referred to above are shown in a distinctive and larger font.

In order to "open" the solenoid, the crimp 29' is reversed or released allowing the valve housing to be removed, thus providing access to the internal components. Various methods of releasing the crimped flange include removing the entire crimped section via machining or using a tool to "peel" the crimp back. There are disadvantages to these methods. If the entire crimped section is removed, then a sleeve should be attached to the coil/housing that provides for a new flange that can be crimped over the valve housing. This is time consuming and therefore expensive to perform in a production setting. If a tool is used to "peel" the crimp back, one of two methods is generally used. Either a tool is used to "peel" small sections of the crimp around the perimeter, or, a tool is used to "peel" the entire perimeter of the crimp in one operation. The first method is time-consuming and therefore expensive to perform in a production setting. The second method may not be feasible because of the configuration of the solenoid.

The crimp 29' can also be reversed by forcing an opposed relative motion between the coil/housing and the valve housing. For example, the coil/housing can be held statically while pulling the valve housing or vice versa. Or, the coil/housing and valve housing can be pulled in opposite directions simultaneously. However, the force required to release the crimp is high because of the circumferential stress in the crimp. In the illustrated solenoid, the valve housing is unable to withstand this induced stress and will break. Thus, a methodology according to one embodiment is disclosed for lowering the circumferential stress by notching the crimp at one or more sections along the perimeter of the crimp. Now, one embodiment of this methodology will be discussed in detail.

Figure 9:
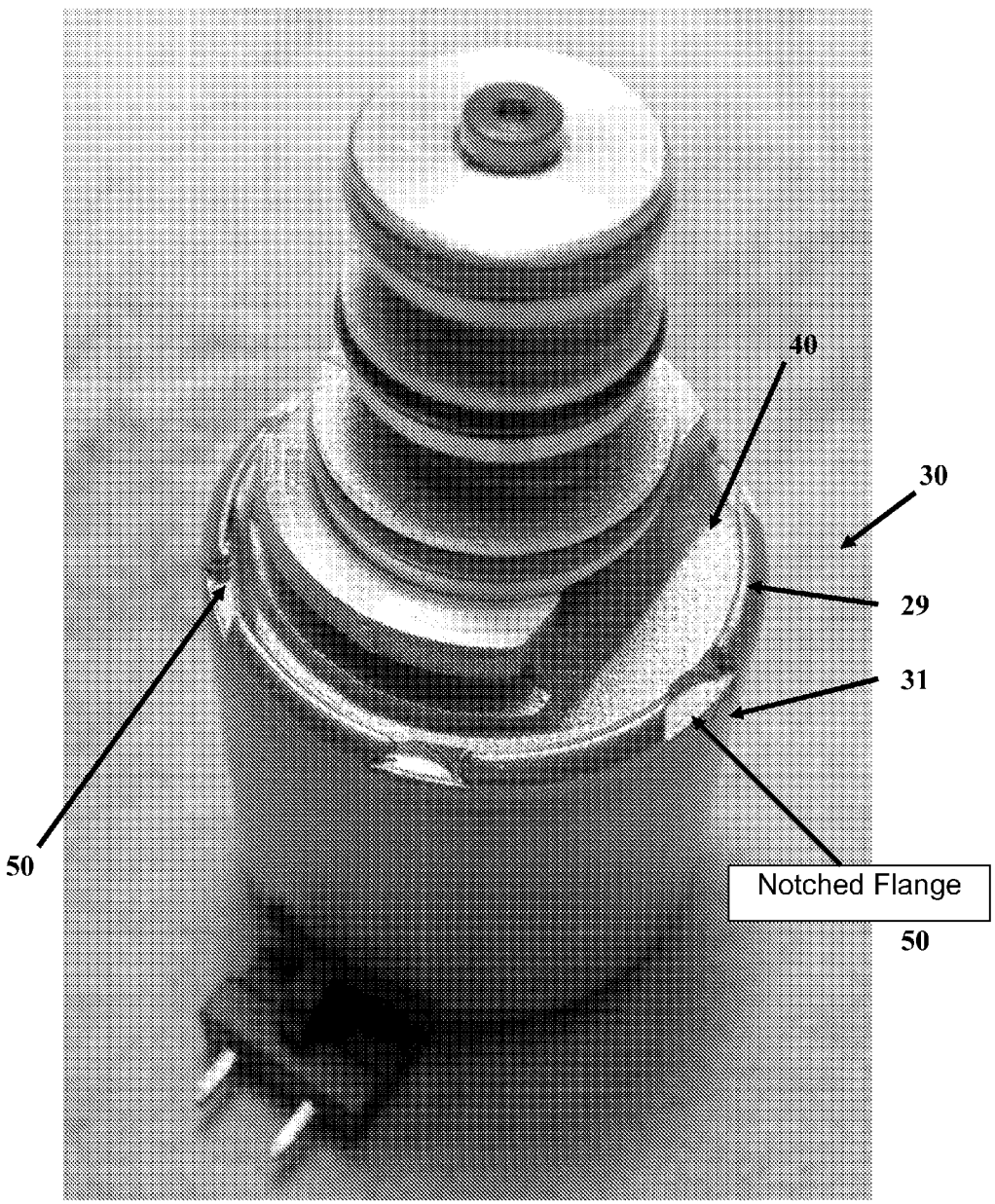
FIG. 9 shows a photographic representation of the solenoid of FIG. 3 after notching.
Figure 10:
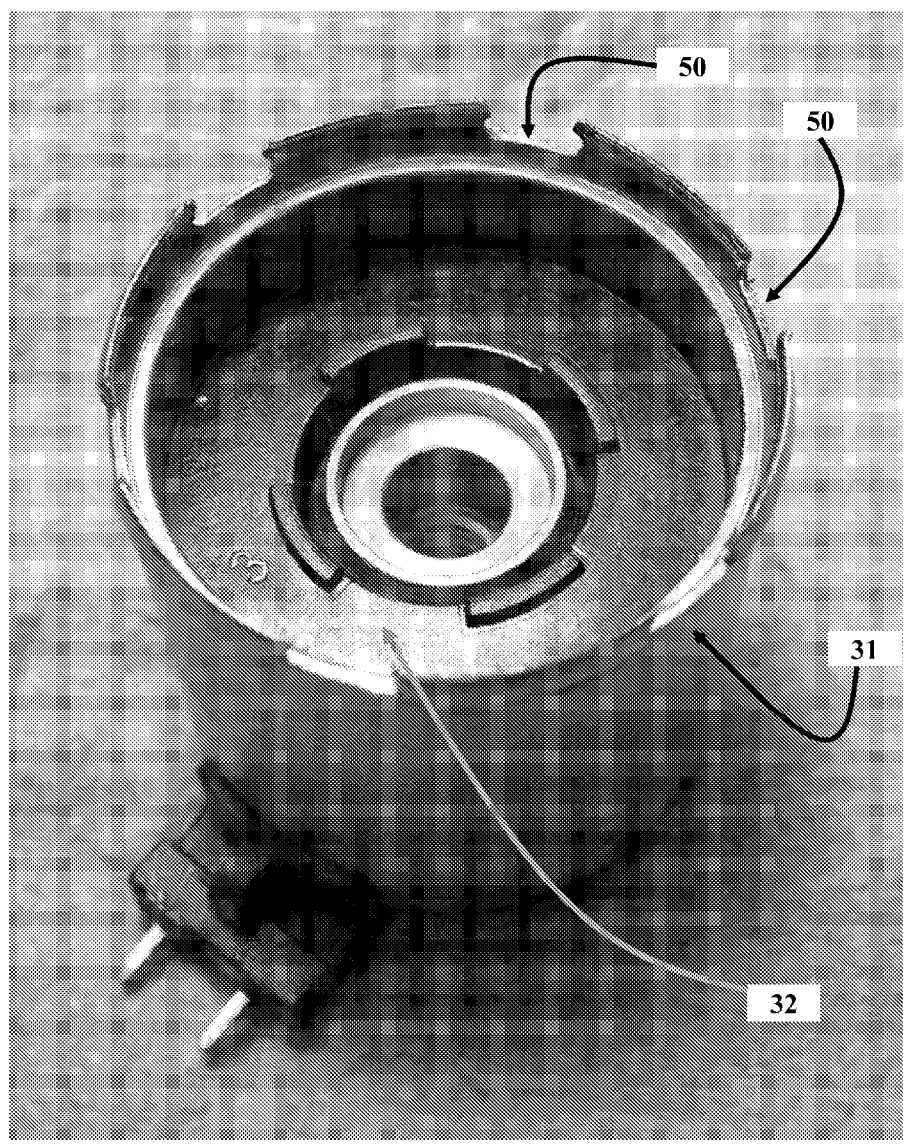
FIG. 10 is a photographic representation of the solenoid of FIG. 9 after opening.

In one embodiment, the solenoid is secured in a fixture and notches are machined at a plurality of locations around the circumference of the coil/housing flange and valve housing interface. As best seen in FIGS. 9 and 10, in one embodiment there are six locations 50, although other embodiments of the present invention are not so constrained and utilize as few as two notches. Further, FIGS. 9 and 10 show that the notches are generally equally spaced apart around the circumference of the coil. However, yet other embodiments include spacings between notches that are not equal.

Machining in one embodiment is performed using a computer numerical control (CNC) milling machine. Tooling in one embodiment includes a 4.76 mm diameter end mill. However, yet other embodiments of the present invention utilize any tool size, and further any machining process, that provide for removal of a crimped over segment of the housing, such that adjacent segments of the crimp are thereafter separated by an opened angular segment (without any of the former crimp).

Several solenoids can be fixtured at one time, allowing multiple solenoids to be machined without operator intervention. The solenoid before this operation is depicted in FIG. 8A. The solenoid subsequent this operation is depicted in FIG. 9. After the notches have been machined, the solenoid is fixtured so the coil/housing section is held statically in place while pulling the valve housing. The coil/housing section after this operation is shown in FIG. 10 with the internal components removed for clarity.

Although what has been shown and described is a method of using a particular cutting tool in a particular machining operation, it is understood that yet other embodiments of the present invention are not so constrained. As one example, the segments can be created by notching the crimped connection with a small cutoff wheel attached to a die grinder. In addition, various types of saw blades can be used to make a saw cut that removes a segment of the crimped material, and further which breaks the hoop configuration of the previously crimped connection. The removal of the crimped connection can be done in any manner, including from a single side, with no mirrored cut on the opposing side. Various embodiments of the present invention contemplate both symmetric and asymmetric removals of material.

It has been found that by removing discrete, separated segments of the crimped joint that the remaining portions of crimped joint become too weak to resist the forcing apart of the valve housing 40 from the coil housing 31. It is believed that there are at least two factors involved in the weakening of the remaining crimped joint: (1) because of the removal of crimped material, there is simply less remaining crimped material to hold components 40 and 31 together; and (2) because the removal is performed in discrete, separated segments, the remaining crimped joint takes on more of the character of a straight, folded over segment as opposed to the original hoop configuration.

With the solenoid opened, the various components within the solenoid can be removed for cleaning, repair or replacement. In situations where the spool valve and housings clearances are outside of specification (and thus resulting in excessive leakage), two methods are contemplated for hydraulically restoring the solenoid. In one embodiment, the valve housing is replaced and in another, the valve housing is machined and paired with a new spool valve.

In one embodiment, the solenoid is hydraulically restored by replacing the valve housing with a new housing. In some embodiments, the housings are constructed from powdered metal. The original spool valve may or may not be reused. Since the spool valve does not typically experience significant wear, it is preferred that the powdered metal housing has the correct inside bore sizes $ID_{1a}$ and $ID_{2a}$ to allow the reuse of the original spool valve. The inside bore diameters of $ID_{1a}$=4.30 mm and $ID_{2a}$=5.45 mm are preferred to provide proper mating with the original spool valve. The preferred surface finish (Ra) on the inside bore surfaces is 0.8 micrometers (32 micro inches) or less. The housing is of similar dimensional construct to the original housing; however, the powdered metal provides for improved wear resistance between the inside bores and the spool valve. In one embodiment, an F-0000 metal is used at 6.7 g/cc density.

For rebuilding the illustrated solenoid, the solenoid is opened using the previously discussed method and the old valve housing is discarded, the internal components of the solenoid are cleaned and checked for damage. If undamaged, the existing spool valve is inspected and installed into the new powder metal housing. The solenoid is assembled with the other components, which may be new, repaired or reused. The solenoid is hydraulically crimped together using a special tool. In those embodiments in which the solenoid housing has been machined to remove separated segments of the previous crimp, then this used housing can be reused, with the remaining segments being inelastically re-deformed to mechanically connect to the spool valve housing. However, in some embodiments, the restoration includes discarding the used solenoid housing 31 after the separated segments have been machined away. To continue restoration new o-rings are installed and the rebuilt solenoid is tested for electrical and hydraulic function. Similar rebuilt solenoids are then installed into a used solenoid module assembly. The original overmolded circuit assembly or a printed circuit board assembly is installed to connect the solenoids to the terminal connector. The solenoid module assembly is subsequently tested.

In another embodiment, the solenoid is hydraulically restored by enlarging the inside bore diameters of the original valve housing and installing a new oversized spool valve with diameters of $OD_{1b}$ and $OD_{2b}$, where $OD_{1b} > OD_{1a}$ and $OD_{2b} > OD_{2a}$. A preferred method is via machining the housing with one or more reamers. In one method, a custom reamer with two outside diameters of approximately $ID_{1b}$ and $ID_{2b}$ is used to enlarge each of the individual bores. This reamer may or may not be piloted. A similar secondary, finishing reamer may be used for producing the desired surface finish by removing minimal material.

In another method, a reamer with an outside diameter of approximately $ID_{1b}$ is used for the small, through bores. Then, the larger bores are machined via a piloted reamer with an outside diameter of approximately $ID_{2b}$. The piloted section of the reamer locates the center of the reamer to the small bores $ID_{1b}$. A non-piloted reamer with an approximate diameter of $ID_{2b}$ may be used in place of a piloted reamer. The reamers can be constructed of high speed steel (HSS) or carbide and may have 2 or more flutes.

Preferred dimensions for the bores are $ID_{1b}=4.38$ mm and $ID_{2b}=5.53$ mm; however, other sizes can be used with similar results. A new spool valve is installed with preferred dimensions of $OD_{1b}=4.36$ mm and $OD_{2b}=5.50$ mm. The spool valve has a preferred surface hardness of 58-62 on the Rockwell C scale (HRC). As examples, the valve can be constructed of 4140, 12L14 or 41L40. A valve with a lower surface hardness is also acceptable. The preferred surface finish (Ra) on the outside surfaces is 0.8 micrometers (32 micro inches) or less.

Preferably, the replacement spool valve has dimensional relationships in the axial direction that are substantially the same as the used spool valve that it replaces. Referring to FIG. 4, the axial dimensions 46, 47, and 48 are substantially the same in the different replacement valve as in the OEM spool valve. Axial length 46 is the length of the metering diameter 44. Axial length 47 is a distance from the same datum point on the spool value to an edge of the larger metering diameter 43. Axial dimension 48 shows the axial length from the same datum to the furthest edge of larger metering diameter 43. If these dimensions 46, 47, and 48 (which those of ordinary skill in the art will recognize can be defined in other ways) are kept substantially the same between the OEM and the replacement valve, then the OEM electrohydraulic relationships (one example of which is shown in FIG. 6) will be maintained by the different replacement valve. It is appreciated that the axial relationships of the spool valve 42 are adapted and configured to interact with the three pairs of metering lands of the valve housing 40' a shown in FIG. 5.

In another version of the invention, a valve constructed from 6061 or 7075 aluminum may be used. The valve may also be coated with a hard coat anodized coating to provide a surface hardness of 60-70 HRC. This coating may or may not be ground afterwards to maintain the critical dimensions of the spool valve. There are several aspects to this embodiment of the invention. First, aluminum has superior thermal properties to a steel valve. Second, the dynamic response of an aluminum valve is faster than a steel valve.

Figure 11:
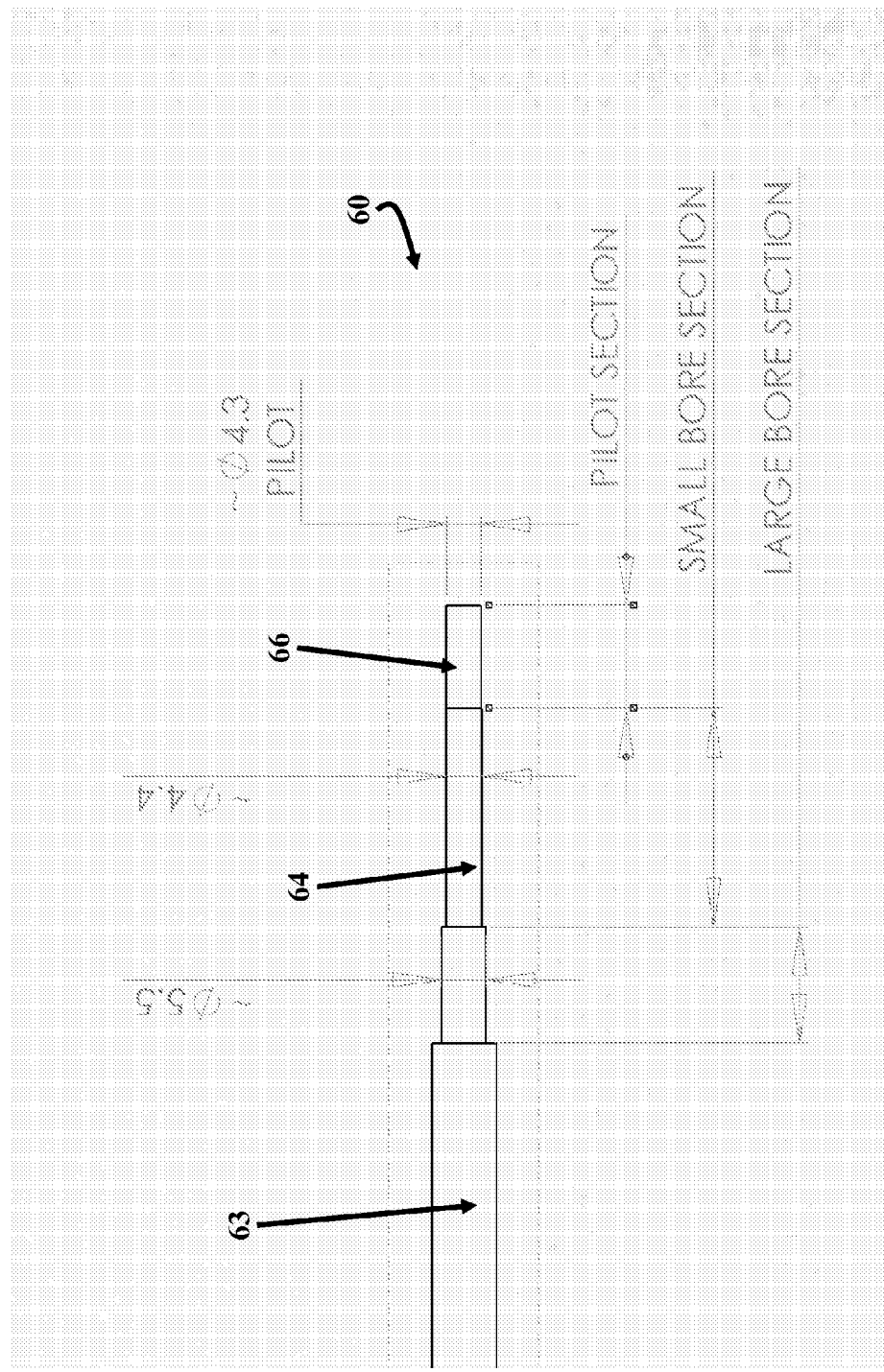
FIG. 11 shows a drawing of a portion of a stepped reamer according to one embodiment of the present invention.

In one method of the currently described embodiment, the solenoid is opened using the previously discussed method. The valve housing is cleaned and inspected for damage. The valve housing is secured in a fixture and the inside diameters are machined using a piloted, stepped reamer. The reamer 60 is shown in FIG. 11 having handle portion 63, cutting section 64, and pilot section 66. The preferred reamer is of a 4 flute design constructed of carbide. Machining fluid is pumped into the valve housing to remove metal chips during the machining operation.

Afterwards, a second piloted, stepped reamer is used to remove a slight amount of material and improve the surface finish. Preferred dimensions for the finished bores are $ID_{1b}=4.38$ mm and $ID_{2b}=5.53$ mm; however, other sizes can be used with similar results. A spool valve is installed with preferred dimensions of $OD_{1b}=4.36$ mm and $OD_{2b}=5.50$ mm. The material for the spool valve is 7075 with a hard coat anodized layer that is ground to the preferred dimensions. The preferred surface hardness is 58-62 HRC. The preferred surface finish (Ra) on the outside surfaces is 0.8 micrometers (32 micro inches) or less.

The other internal components of the solenoid are cleaned and checked for damage. The oversized spool valve is inserted into the valve housing. The solenoid is assembled with the other components, which may be new, repaired or reused. The solenoid is hydraulically crimped together using a special tool. New o-rings are installed and the rebuilt solenoid is tested for electrical and hydraulic function. Similar rebuilt solenoids are then installed into a used solenoid module assembly. The original overmolded circuit assembly or a printed circuit board assembly is installed to connect the solenoids to the terminal connector. The solenoid module assembly is subsequently tested.

Figure 12:
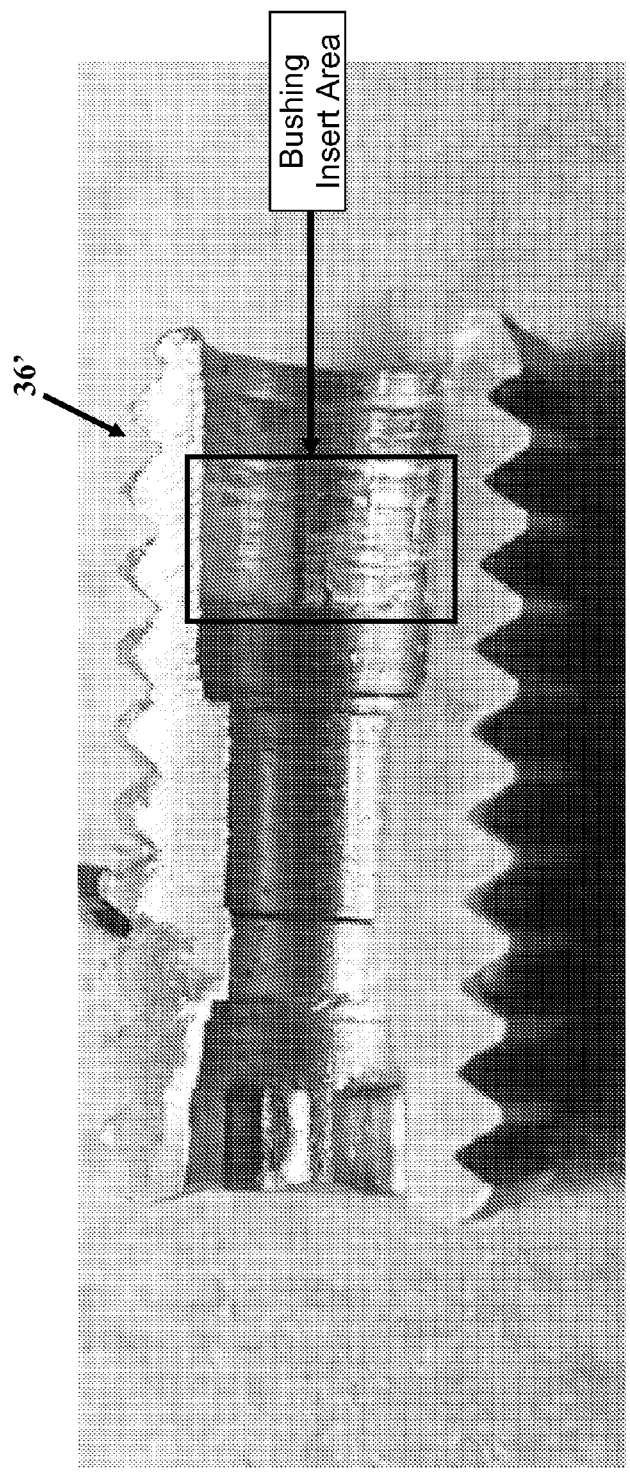
FIG. 12 is a photographic representation of a set screw/bushing assembly cross section prior to insertion of the bushing.

The illustrated solenoid contains other internal components that may experience wear and cause performance issues. One such component is the threaded set screw/bushing assembly that performs two functions. First, the set screw assembly can be adjusted to control the spring pressure within the solenoid. This has the net effect of controlling the pressure response curve in FIG. 6. Additionally, the set screw assembly contains a bushing that supports the pin section of the plate/pin assembly as shown in FIG. 4. A cross section of the set screw is shown in FIG. 12. The bushing is inserted into the area highlighted in FIG. 12.

One method for repairing the bushing is to mechanically remove the existing bushing from the set screw. Another method would be to insert a new bushing into a new set screw. The bushing can be made from several materials, including polytetrafluoroethylene (PTFE), nylon, bronze or a self-lubricating alloy or composite such as graphite/bronze. A multiple piece type bushing could be used as well, such as a steel bushing that is coated with an above mentioned material. In the preferred embodiment, the bushing is removed from the existing set screw. A new bushing is lightly coated with an adhesive and inserted into the existing set screw. The preferred material is a self-lubricating graphite/bronze material. The threaded section of the set screw/bushing assembly is coated with a thread locking material prior to assembly with the VFS solenoid.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for restoring a used solenoid and valve assembly, comprising:
providing a used solenoid assembly including a solenoid housing connected by a continuous circular crimped mechanical connection to a valve housing, the solenoid housing holding within it an electromagnetic actuator, the valve housing holding within it a valve element movable by the actuator;
removing at least two, separated segments of the crimped connection;
retaining the remainder of the crimped connection after said removing; and
pulling apart the used valve housing from the used solenoid housing after said removing and after said retaining.

2. The method of claim 1 wherein said pulling inelastically deforms the remainder of the crimped connection.

3. The method of claim 1 wherein said pulling is performed by holding the used solenoid housing, holding the used valve housing, and pulling the used solenoid housing and used valve housing in opposite directions.

4. The method of claim 1 wherein the valve element is movable by the actuator along an axis and said pulling is along the axis.

5. The method of claim 1 wherein said removing is performed by machining away a portion of at least one of the used solenoid housing and the used valve housing within each segment.

6. The method of claim 1 wherein said removing is performed by machining away a portion of the used solenoid housing and a portion of the used valve housing within each segment.

7. The method of claim 1 wherein said removing comprises removing six, equally spaced segments from the used crimped connection.

8. The method of claim 1 which further comprises replacing one of the used valve housing or the used valve element with a corresponding different valve housing or valve element, and reassembling the one used and the one replaced into the used solenoid housing.

9. The method of claim 1 which further comprises reassembling the valve housing into the used solenoid housing after said pulling and recrimping the used solenoid housing to the valve housing.

10. The method of claim 9 wherein said recrimping is of the remainder of the crimped connection.

11. The method of claim 1 wherein said valve housing is a powdered metal valve housing, and said method further comprises reassembling the powdered metal valve housing into the used solenoid housing.

12. The method of claim 1 wherein the valve element is a spool valve.

13. The method of claim 1 wherein the valve element is a ball.

14. A method for restoring a used solenoid and valve assembly, comprising:
providing a used solenoid assembly including a solenoid housing connected by a continuous circular crimped connection to a valve housing, the housing holding within it an electromagnetic actuator, the valve housing holding within it a spool valve movable by the actuator along an axis;
reducing the cross sectional thickness of the crimped mechanical connection about its circumference by a machining operation;
separating the solenoid housing from the valve housing;
disassembling the used valve housing and used spool valve from the used solenoid assembly;
replacing the used spool valve with a different spool valve having substantially the same dimensional relationships in the axial direction as the used spool valve, and having larger metering diameters than the corresponding metering diameters of the used valve;
increasing the inner diameters of the metering lands of the used valve housing to receive therethrough the corresponding metering diameters of the different valve;
reassembling the different spool valve and the used valve housing with increased inner diameters with the solenoid housing; and
testing the flow characteristics of the reassembled solenoid assembly.

15. The method of claim 14 wherein said increasing is performed by mechanically reaming each inner diameter.

16. The method of claim 15 wherein said reaming is performed with a stepped reamer.

17. The method of claim 15 wherein each inner diameter is mechanically reamed simultaneously with each other inner diameter.

18. The method of claim 14 wherein the used solenoid assembly demonstrated electrohydraulic flow characteristics within a range of OEM flow characteristics when new, and wherein said testing verifies that the reassembled solenoid assembly demonstrates electrohydraulic flow characteristics within the OEM range.

* * * * *

UNITED STATES PATENT AND TRADEMARK OFFICE
CERTIFICATE OF CORRECTION

PATENT NO. : 8,387,254 B2
APPLICATION NO. : 12/905409
DATED : March 5, 2013
INVENTOR(S) : Fathauer Page 1 of 1

It is certified that error appears in the above-identified patent and that said Letters Patent is hereby corrected as shown below:

In the Specification

In column 8, line 10, please delete "house 40" and insert in lieu thereof --valve housing 40'--.

Signed and Sealed this
Eleventh Day of June, 2013

Teresa Stanek Rea
*Acting Director of the United States Patent and Trademark Office*